Figure 4:
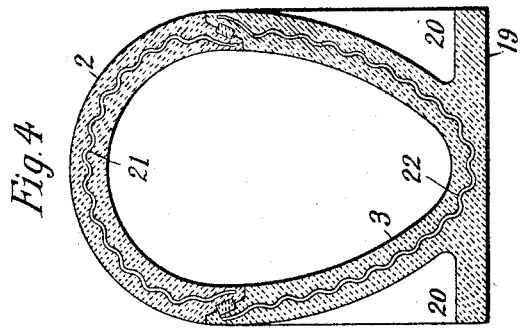

No. 798,487. PATENTED AUG. 29, 1905.
P. AYLETT.
METHOD OF BUILDING CONDUITS.
APPLICATION FILED MAY 4, 1905.
2 SHEETS—SHEET 1.
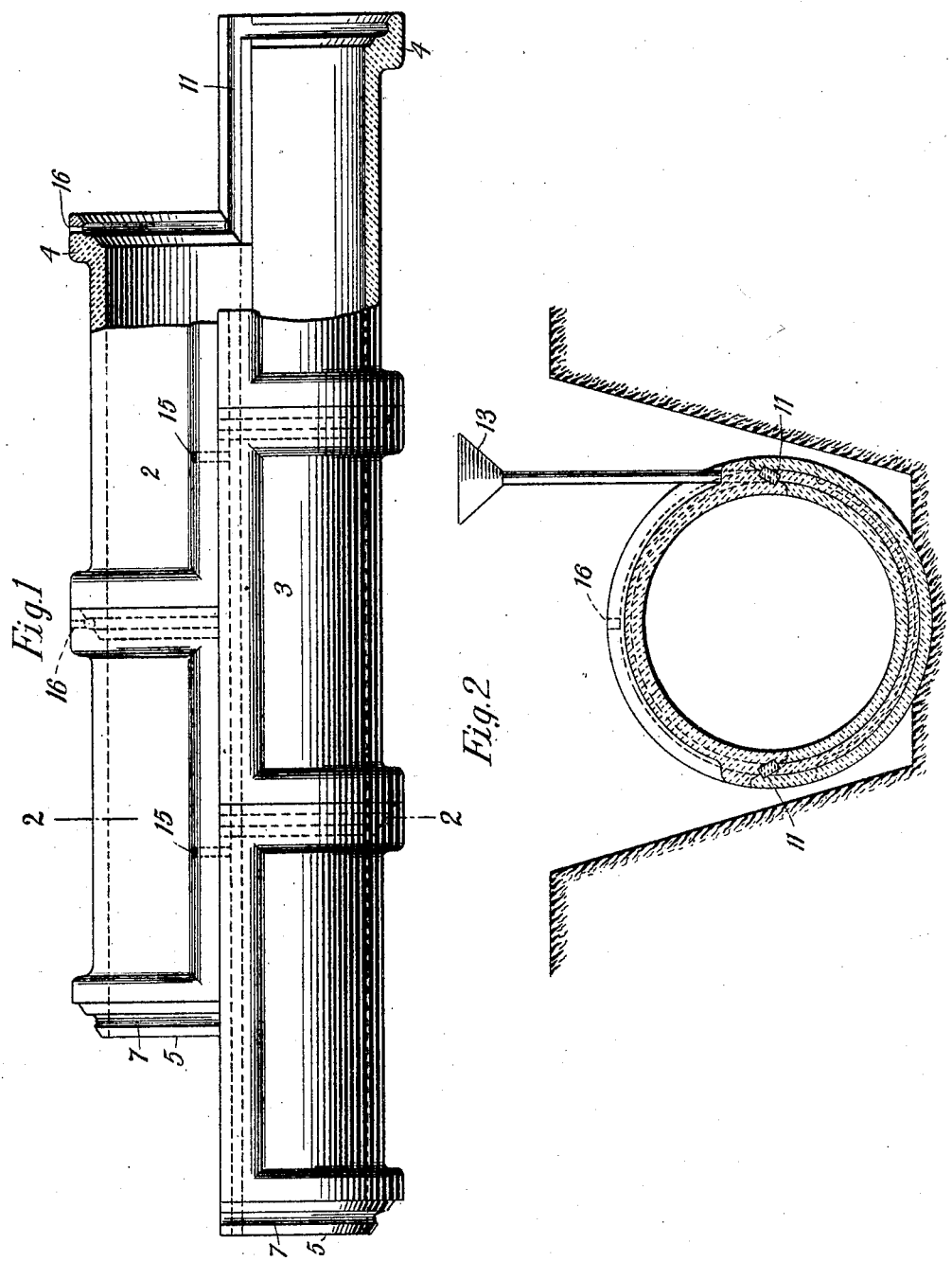
Witnesses
John C. Kerr
Thomas J. Byrnes
Philip Aylett, Inventor
By his Attorneys
Kerr Page & Cooper No. 798,487. PATENTED AUG. 29, 1905.
P. AYLETT.
METHOD OF BUILDING CONDUITS.
APPLICATION FILED MAY 4, 1905.

2 SHEETS—SHEET 2.

Witnesses
John C. Kerr
Thomas J. Byrnes

Inventor
Philip Aylett
By his Attorneys
Kerr Page Cooper

UNITED STATES PATENT OFFICE.

PHILIP AYLETT, OF PORTSMOUTH, VIRGINIA.

METHOD OF BUILDING CONDUITS.

No. 798,487.     Specification of Letters Patent.     Patented Aug. 29, 1905.

Application filed May 4, 1905. Serial No. 258,772.

*To all whom it may concern:*

Be it known that I, PHILIP AYLETT, a citizen of the United States, residing at Portsmouth, in the county of Norfolk and State of Virginia, have invented certain new and useful Improvements in Methods of Building Conduits, of which the following is a specification, reference being had to the drawings accompanying and forming a part of the same.

My invention is an improvement in the art of building pipe-lines or conduits for water, sewage, or other purposes, and has for its main objects the provision at a reduced cost of a strong and durable pipe and the avoidance of many of the engineering difficulties heretofore encountered in the operation of constructing and laying conduits of this kind, particularly those which involve the use of pipes of large size.

Stated in general terms my improved method is carried out in the following manner: I construct of cement or other plastic material, by any of the ordinary processes and in any convenient locality with reference to the place of permanent installation, a pipe or conduit in sectional units, each constituting a longitudinal half or, if desired or need be, a smaller fractional part of a pipe-section. For present purposes, however, it is sufficient to consider only the case where each unit comprises a complete lower or upper half of a pipe-section. The longitudinal edges of these units are molded or fashioned to form a scarf-joint when the units are assembled, and grooves are provided along the meeting edges to form a keyway for locking the two edges together by the insertion therein of a proper key. One end of each unit is, moreover, formed as a bell and the other as a spigot, but each with beveled surfaces to form a scarf-joint with grooves in the faces thereof, which constitute when the ends of two sections are united a transverse keyway by means of which such sections may be locked together by the insertion of a suitable key. In laying this pipe any desired number of the sectional units which are to constitute the lower half of the pipe or conduit are laid in a trench or upon a suitable foundation, the spigot end of one section entering the bell of the next, as in the case of an ordinary pipe. Upon these the upper sectional units are then laid so as to break joint with those below, the ends being matched, as in the case of the lower units. As the upper sections are laid upon the lower there will be formed a continuous keyway within the material of the pipe by the registering grooves in the contiguous longitudinal edges of the sections. There will also be formed by the grooves in the contiguous surfaces of the bell and spigot ends of the sectional units semicircular keyways in each transverse joint between said units, and as the logitudinal and the transverse grooves in each unit are preferably continuous—that is to say, opening one into the other—the two sets of keyways thus formed will be in direct communication with each other throughout any length of pipe that may be thus assembled. These keyways may be filled with a suitable cement in a semifluid or plastic state as the sections are set in place, or they may be filled by forcing cement in a semifluid state into them after two or any number of sections have been laid. In some cases iron or steel rods may be inserted into the longitudinal keyways, and these rods may be in any desired length, but are preferably of such size as to only partially fill the keyways, so that the remaining space may then be filled with cement in the manner above set forth. In case metal or similar keys of the character described are introduced they should extend across the transverse joints between contiguous sections, so as to give added rigidity to the pipe.

By constructing the pipe in sections of the character above specified and laying these sections in the manner prescribed I am enabled to construct a pipe-line of any dimension and of indefinite length much more economically and efficiently than has heretofore been possible. The units which it is necessary to handle or transport are comparatively small and light, while they are securely locked together both transversely and longitudinally by tight joints, which render the pipe as a complete structure capable of conveying fluids or even gases under pressure.

In order to more fully illustrate the preferred manner of carrying out my invention and certain of the more prominent advantages secured thereby, I now refer to the accompanying drawings.

Figure 6:
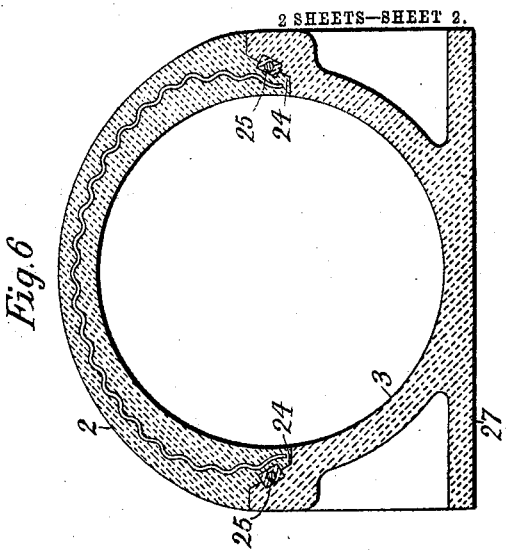
Figure 3:
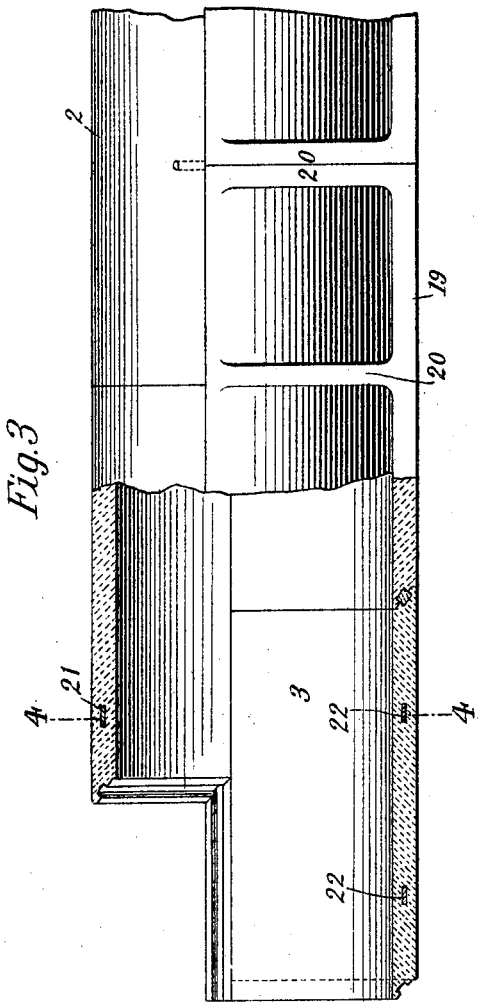
Figure 5:
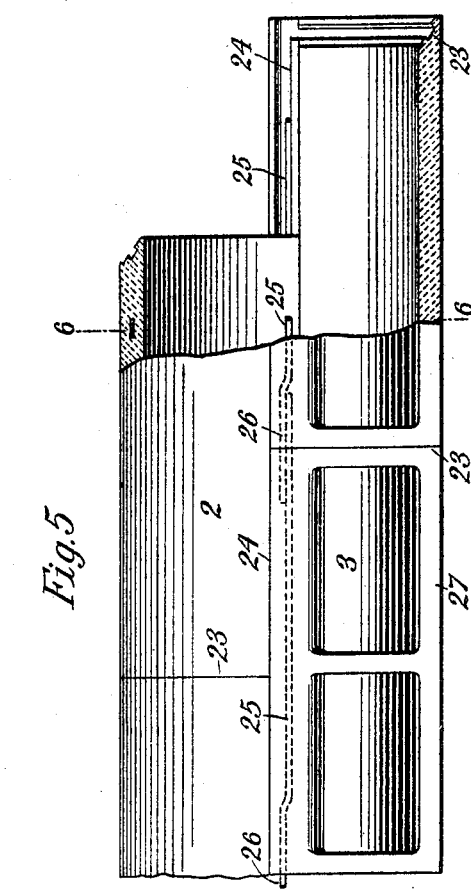

Figure 1 is a side elevation, partly in section, of a portion of a conduit substantially circular in cross-section and constructed in accordance with my invention. Fig. 2 is a transverse sectional view of the same on the line 2 2 of Fig. 1. Fig. 3 is a side elevation, partly in section, illustrating a modification of the form of conduit. Fig. 4 is a sectional view on line 4 4 of Fig. 3. Fig. 5 is a side elevation, partly in section, illustrating a further modification in the form and a specific improvement in the method of constructing the conduit. Fig. 6 is a sectional view of the same on line 6 6 of Fig. 5.

2 designates one of the upper and 3 one of the lower sectional units of my improved pipe or conduit. These are molded or formed from a suitable plastic substance, such as cement, in any proper shape, each to constitute one-half (more or less) of a section of pipe or conduit circular, elliptical, or the like in cross-section. One end 4 of each unit is bell-shaped to form a socket for the end of the next adjacent unit, which has a corresponding spigot or tapered end 5 to fit therein, and the longitudinal edges are beveled so that when associated the upper and lower units will fit together with a scarf-joint. The ends and edges of each unit are thickened, as indicated in Fig. 1, or the entire body of each unit when weight is not a desideratum is made of such thickness, as shown in Fig. 3, that all contiguous edges and exterior surfaces shall be flush with one another when the units are assembled in a complete pipe. Along each beveled edge of the pipe units 2 3 are formed grooves 11, which when the units are assembled form longitudinal keyways, as shown in the sectional views 2, 4, and 6. In the corresponding surfaces at the ends of the units are similar grooves 7, extending between the longitudinal grooves on each edge, which form transverse keyways when the ends are brought together, as indicated in Fig. 1. In using these elements in the construction of a conduit the lower units or sections, as I have already pointed out, are first laid in any desired number and the upper units are then set in place upon them, but so as to break joint with the under sections, as shown in Fig. 1. A long line of pipe may thus be laid and covered, if so desired, before the final step of closing and locking the joints is effected. In such case cement or some similar material in a semifluid or viscous state is forced by pressure into the communicating keyways and allowed to set or harden. If desired, however, the cement or whatever is used to form the keys may be introduced as each section is laid or pair of sections assembled. For this purpose small ducts 15 and 16 may be formed in the pipe to permit the introduction of the cement or like material into the keyways in the upper and lower portions of the pipe, as by means of a funnel 13. Any other means of applying the keys may be followed; but it will be observed that the plan of construction of the conduit above proposed presents the advantage of permitting a considerable length of pipe to be laid and the interlocking and calking of a number of sections to be effected by a single operation.

In the modified form of pipe shown in Figs. 3 and 4 the units are molded in such manner that the pipe will be approximately elliptical in cross-section, the lower part being provided with an enlarged flat base 19, consisting of laterally-extending flanges supported at intervals by vertical flanges 20. The upper and lower sections are also reinforced at intervals with strips of metal 21 22 of any desired width and embedded in the material of which the sections are composed.

In Figs. 5 and 6 the pipe is substantially circular and provided, as in the previous instances, with transverse longitudinal scarf-joints 23 and 24 with keyways therein. In the longitudinal keyways metal bars or rods 25 with overlapped ends 26 are introduced. These rods or bars, which operate to tie the sections of the pipe together, are inserted in the keyways before the liquid sealing and locking material is applied, and the said material flows around the bars or rods and is reinforced by the same. By reinforcing a conduit in this manner it is made capable of sustaining very considerable weight, so that it will not leak or break should the supporting-surface beneath a portion of it be carried away in a washout or the like. The lower sections have a flat base 27, constructed substantially like that shown in Figs. 3 and 4 of the drawings, and this construction is generally adopted for pipes of large size and which are laid upon a firm foundation.

I am aware that tubular structures, including pipes, have been provided in some instances with keyways within the joint at the ends for the reception of a key, such as lead or cement introduced while in a fluid or plastic state and in other instances with butt-joints along the longitudinal edges of separable sections containing keyways for the insertion of bars or other rigid keys. I am further aware that conduits have been constructed of longitudinally-separable sectional units and that such units have been in some cases provided with interlocking longitudinal edges rendered effective by sliding one unit longitudinally into engagement with another. In general such units have been assembled so that the upper sections break joint with the lower. By my invention, as above described, however, I am enabled to construct a conduit in which all the units are interlocked and calked in a more simple and effective manner. Moreover, my method of building conduits permits me to lay the lower portion of the same in any length before inclosing it and even to deviate slightly from a straight line in laying the under portion without rendering it difficult to set the upper units in place.

I do not claim herein as a structure the pipe or conduit which I have used in illustrating the invention, as I have made this the subject of another application for Letters Patent; but What I now claim is—

1. The method of constructing conduits herein described, which consists in forming pipe-sections in longitudinally-separable units with ends and edges adapted to form scarf-joints and provided with grooves in the contiguous faces thereof to form keyways when the units are assembled, laying a series of said units to form the lower portion of the conduit, placing thereon, but so as to break joint with the sections of the same, the units to form the upper portion of the conduit, and inserting keys in the transverse and longitudinal keyways to lock together the abutting ends and edges of said units.

2. The method of constructing conduits herein described, which consists in forming pipe-sections in longitudinally-separable units with ends and edges adapted to form scarf-joints and provided with grooves in the contiguous faces of the joints to form keyways when the units are assembled, laying a series of said units to form the lower portion of a conduit, placing thereon, but so as to break joint with the sections of the same, the units to form the upper portion of the conduit, and introducing in a semifluid or plastic state into the transverse and longitudinal keyways a material capable of hardening to form a key for locking together the abutting ends and edges of the said units.

3. The method of constructing conduits herein described which consists in forming pipe-sections in longitudinally-separable units with ends and edges adapted to form scarf-joints and provided with continuous grooves in the contiguous faces of the joints to form communicating keyways when the units are assembled, laying a series of said units to form the lower portion of the conduit, placing thereon, but so as to break joint with the sections of the same, the units to form the upper portion of the conduit, and forcing into the keyways, a material in a semifluid or plastic state, which is capable of hardening to form a key and locking together the abutting ends and edges of the said units.

4. The method of constructing conduits herein described, which consists in forming pipe-sections in longitudinally-separable units, with ends and edges adapted to form scarf-joints and provided with continuous grooves in the contiguous faces of the joints to form communicating keyways when the units are assembled, laying a series of said units to form the lower portion of the conduit, placing thereon, but so as to break joint with the sections of the same, the units to form the upper portion of the conduit, and calking and locking the joints between the assembled units by introducing into the keyways cement in a semiliquid or plastic state, as set forth.

5. The method of constructing conduits herein described, which consists in forming pipe-sections in longitudinally-separable units, with ends and edges adapted to form scarf-joints and provided with continuous grooves in the contiguous faces of the joints, to form keyways when the units are assembled, laying a series of said units to form the lower portion of the conduit, placing thereon, but so as to break joint with the sections of the same, the units to form the upper portion of the conduit, inserting in the longitudinal keyways bars or rods of rigid material and filling the transverse keyways in the ends of the units and the remaining space in the longitudinal keyways with cement in a semifluid or plastic state.

6. The method of constructing conduits herein described, which consists in forming pipe-sections in longitudinally-separable units with ends and edges adapted to form scarf-joints and provided with grooves in the contiguous faces of said joints to form keyways when the units are assembled, laying a series of said units to form the lower portion of said conduit, placing thereon, but so as to break joint with the sections of the same, the units to form the upper portion of the conduit, inserting in the longitudinal keyways bars or rods of rigid material, extending across the transverse joints between the units, and filling the transverse keyways and the remaining space in the longitudinal keyways with a plastic material, such as cement.

PHILIP AYLETT.

Witnesses:
M. LAWSON DYER,
JOHN C. KERR.